(12) United States Patent
Ma et al.

(10) Patent No.: US 12,555,319 B2
(45) Date of Patent: Feb. 17, 2026

(54) SYSTEM STATE MANAGEMENT IN CENTRALIZED RENDERING ENVIRONMENT

(71) Applicant: Apple Inc., Cupertino, CA (US)

(72) Inventors: Mark L. Ma, San Francsico, CA (US); Michael E. Buerli, San Francisco, CA (US); Zhengzheng Li, Cupertino, CA (US); Scott M. Andrus, Sunnyvale, CA (US); William E. Blumhardt, San Francisco, CA (US); Aviv Miron, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 175 days.

(21) Appl. No.: 18/381,144

(22) Filed: Oct. 17, 2023

(65) Prior Publication Data

US 2024/0404196 A1 Dec. 5, 2024

Related U.S. Application Data

(60) Provisional application No. 63/470,958, filed on Jun. 4, 2023.

(51) Int. Cl.
*G06T 17/00* (2006.01)
*G06T 19/00* (2011.01)

(52) U.S. Cl.
CPC .......... *G06T 17/005* (2013.01); *G06T 19/006* (2013.01)

(58) Field of Classification Search
CPC ..... G06T 17/005; G06T 19/006; G06F 3/011; G06F 9/451
See application file for complete search history.

(56) References Cited

U.S. PATENT DOCUMENTS

| 11,531,556 B2 * | 12/2022 | Xiao ..................... G06F 3/0488 |
| 2008/0278482 A1 * | 11/2008 | Farmanbar ............ G06T 17/005 345/419 |

* cited by examiner

*Primary Examiner* — Jeffery A Brier
(74) *Attorney, Agent, or Firm* — BAKERHOSTETLER (57) ABSTRACT

Aspects of the subject technology provide for system state management in a centralized rendering environment. A system may initialize a tree structure for a three-dimensional environment. The system renders the three-dimensional environment based at least in part on a traversal of the tree structure. The system identifies a request to change first or second visual states. The system can determine a first state update to the first visual state and a second state update to the second visual state and updates the tree structure by passing, by a first node, the first state update to a first child node and separately passing the second state update to a second child node. The system re-renders the three-dimensional environment based at least in part on a traversal of the updated tree structure.

20 Claims, 6 Drawing Sheets

SYSTEM STATE MANAGEMENT IN CENTRALIZED RENDERING ENVIRONMENT

CROSS-REFERENCE TO RELATED APPLICATION(S)

This application claims the benefit of U.S. Provisional Application Ser. No. 63/470,958, entitled "SYSTEM STATE MANAGEMENT IN CENTRALIZED RENDERING ENVIRONMENT," and filed on Jun. 4, 2023, the disclosure of which is expressly incorporated by reference herein in its entirety.

TECHNICAL FIELD

The present description relates generally to electronic devices including, for example, system state management in a centralized rendering environment.

BACKGROUND

Augmented reality technology aims to bridge a gap between virtual environments and a physical environment by providing a view of the physical environment that is augmented with electronic information. As a result, the electronic information appears to be part of the physical environment as perceived by a user.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Implementations of the subject technology described herein provide for constructing and deconstructing a three-dimensional (3D) representation of various user interface (UI) experiences of a three-dimensional environment into a compressed and performant representation used for two-dimensional (2D) graphics. The underlying concept is visually represented by using individual nodes of a logical bidirectional graph, which correspond to different layers and/or user experiences of the 3D representation. The subject technology can account for situational factors and ensure that non-active UI experiences are hidden (or backgrounded) and/or that the current system state represents the correct mode or configuration for the 3D representation. This may enable proper system behavior and/or may ensure adherence to system policies.

In one or more implementations, at the occurrence of an application process launching, such as a mail application, a single level node (and/or user experience/application node) may be added to the logical bidirectional graph. This node may correspond to, for example, an application, a user experience and/or a system process (such as settings). Additionally, system level layers and/or a system scene can be represented by separate sets of nodes in the logical bidirectional graph. Other layers, such as a lock screen and general manager layer, for example, can exist as lower-level nodes associated with the aforementioned nodes. The overarching objective is to break down each 3D UI experience of the three-dimensional environment into distinct parts/nodes. Each node can contribute its knowledge and preferences to another node in a different level in the logical bidirectional graph, allowing for the transmission of preferences and notices between higher-level nodes and lower-level nodes.

The approach of constructing the logical bidirectional graph aims to alleviate challenges regarding the placement and acquisition of elements within the system. The relative positions of components can be derived from each node's individual state. In this context, each node, regardless of its corresponding function, can send and receive responses within the logical bidirectional graph. By sending preferences upward to higher-level nodes, a lower-level node can influence changes if it possesses a preference. Conversely, a higher-level node can communicate downward to lower-level nodes to inform associated child nodes or descendant nodes (e.g., nodes that are more than one level separation from the associated higher-level node) about modifications or desired alterations resulting from its understanding of its immediate environment.

In one or more implementations, a system may initialize the graph in the form of a tree structure for a three-dimensional environment. The system renders the three-dimensional environment based at least in part on a traversal of the tree structure. The system identifies a request to change first or second visual states. The system can determine a first state update to the first visual state and a second state update to the second visual state and updates the tree structure by passing, by a first node, the first state update to a first child node and separately passing the second state update to a second child node. The system then renders the three-dimensional environment based at least in part on a traversal of the updated tree structure.

These and other embodiments are discussed below with reference to FIGS. 1-6. However, those skilled in the art will readily appreciate that the detailed description given herein with respect to these Figures is for explanatory purposes only and should not be construed as limiting.

Figure 1:
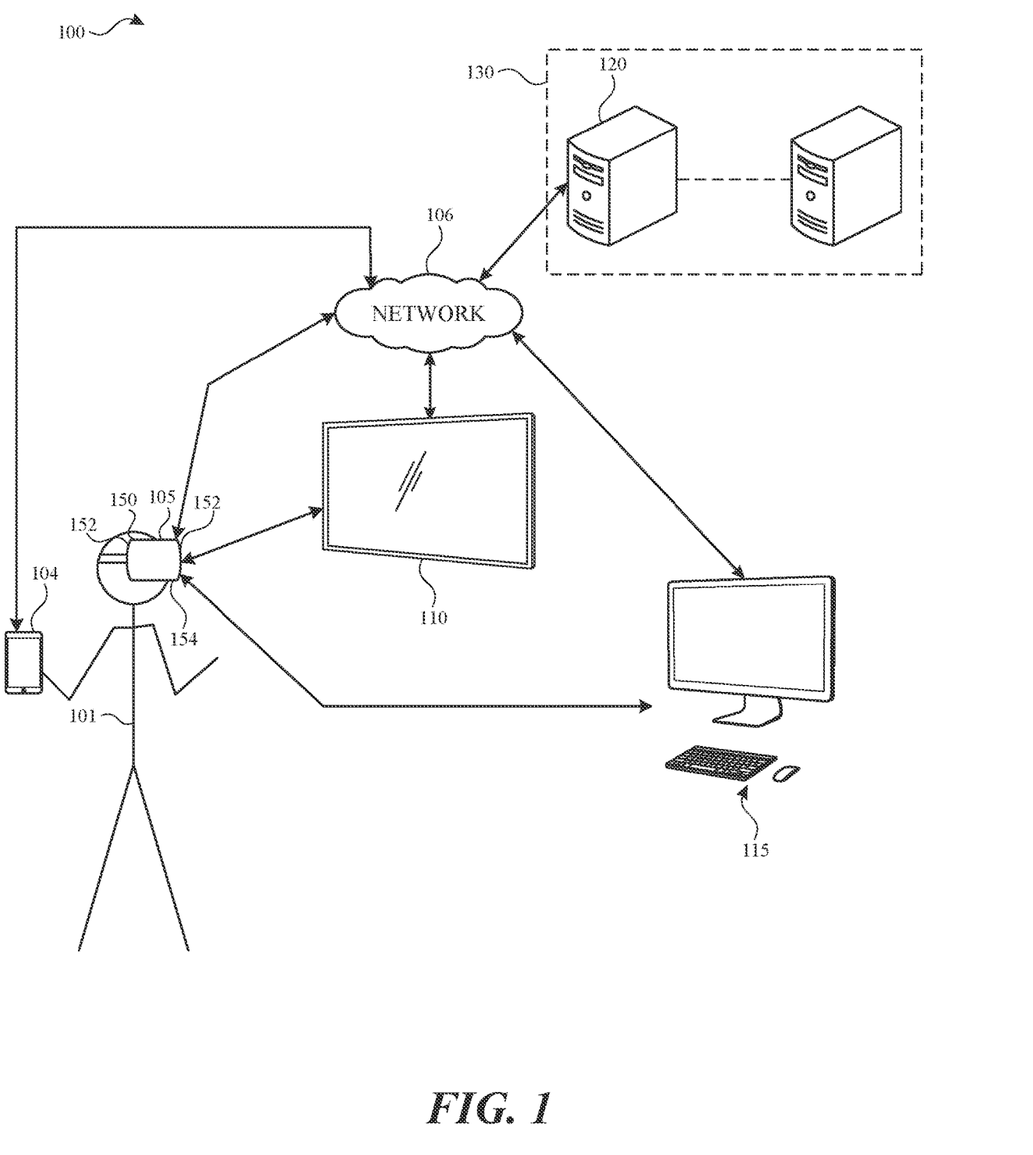
FIG. 1 illustrates an example system architecture including various electronic devices that may implement the subject system in accordance with one or more implementations of the subject technology.

FIG. 1 illustrates an example system architecture 100 including various electronic devices that may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The system architecture 100 includes an electronic device 105, a handheld electronic device 104, an electronic device 110, an electronic device 115, and a server 120. For explanatory purposes, the system architecture 100 is illustrated in FIG. 1 as including the electronic device 105, the handheld electronic device 104, the electronic device 110, the electronic device 115, and the server 120; however, the system architecture 100 may include any number of electronic devices, and any number of servers or a data center including multiple servers.

The electronic device 105 is illustrated in FIG. 1 is a head-mounted portable system (e.g., worn by a user 101); however, the electronic device 105 may also be implemented, for example, as a tablet device, a handheld and/or mobile device. The electronic device 105 includes a display system capable of presenting a visualization of a computer-generated reality environment to the user. The electronic device 105 may be powered with a battery and/or another power supply. In an example, the display system of the electronic device 105 provides a stereoscopic presentation of the computer-generated reality environment, enabling a three-dimensional visual display of a rendering of a particular scene, to the user. In one or more implementations, instead of, or in addition to, utilizing the electronic device 105 to access a computer-generated reality environment, the user may use a handheld electronic device 104, such as a mobile device, tablet, watch, and the like.

The electronic device 105 may include one or more cameras such as camera(s) 150 (e.g., visible light cameras, infrared cameras, etc.). Further, the electronic device 105 may include various sensors 152 including, but not limited to, cameras, image sensors, touch sensors, microphones, inertial measurement units (IMU), heart rate sensors, temperature sensors, depth sensors (e.g., Lidar sensors, radar sensors, sonar sensors, time-of-flight sensors, etc.), GPS sensors, Wi-Fi sensors, near-field communications sensors, radio frequency sensors, etc. Moreover, the electronic device 105 may include hardware elements that can receive user input such as hardware buttons or switches. User input detected by such sensors and/or hardware elements correspond to, for example, various input modalities for performing one or more actions, such as initiating video capture of physical and/or virtual content. For example, such input modalities may include, but are not limited to, facial tracking, eye tracking (e.g., gaze direction), hand tracking, gesture tracking, biometric readings (e.g., heart rate, pulse, pupil dilation, breath, temperature, electroencephalogram, olfactory), recognizing speech or audio (e.g., particular hotwords), and activating buttons or switches, etc.

In one or more implementations, the electronic device 105 may be communicatively coupled to a base device the electronic device 115. Such a base device may, in general, include more computing resources and/or available power in comparison with the electronic device 105. In an example, the electronic device 105 may operate in various modes. For instance, the electronic device 105 can operate in a standalone mode independent of any base device. When the electronic device 105 operates in the standalone mode, the number of input modalities may be constrained by power and/or processing limitations of the electronic device 105 such as available battery power of the device. In response to power limitations, the electronic device 105 may deactivate certain sensors within the device itself to preserve battery power and/or to free processing resources.

The electronic device 105 may also operate in a wireless tethered mode (e.g., connected via a wireless connection with a base device), working in conjunction with a given base device. The electronic device 105 may also work in a connected mode where the electronic device 105 is physically connected to a base device (e.g., via a cable or some other physical connector) and may utilize power resources provided by the base device (e.g., where the base device is charging the electronic device 105 while physically connected).

When the electronic device 105 operates in the wireless tethered mode or the connected mode, a least a portion of processing user inputs and/or rendering the computer-generated reality environment may be offloaded to the base device thereby reducing processing burdens on the electronic device 105. For instance, in an implementation, the electronic device 105 works in conjunction with the electronic device 115 to generate a computer-generated reality environment including physical and/or virtual objects that enables different forms of interaction (e.g., visual, auditory, and/or physical or tactile interaction) between the user and the generated computer-generated reality environment in a real-time manner. In an example, the electronic device 105 provides a rendering of a scene corresponding to the computer-generated reality environment that can be perceived by the user and interacted with in a real-time manner. Additionally, as part of presenting the rendered scene, the electronic device 105 may provide sound, and/or haptic or tactile feedback to the user. The content of a given rendered scene may be dependent on available processing capability, network availability and capacity, available battery power, and current system workload.

The network 106 may communicatively (directly or indirectly) couple, for example, the electronic device 104, the electronic device 105, the electronic device 110, and/or the electronic device 115 with each other device and/or the server 120. In one or more implementations, the network 106 may be an interconnected network of devices that may include, or may be communicatively coupled to, the Internet.

In FIG. 1, by way of example, the electronic device 110 is depicted as a television. The electronic device 110 may include a touchscreen and may be, for example, a television that includes a touchscreen, a smartphone that includes a touchscreen, a portable computing device such as a laptop computer that includes a touchscreen, a companion device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 110 may not include a touchscreen but may support touchscreen-like gestures, such as in a computer-generated reality environment. In one or more implementations, the electronic device 110 may include a touchpad. In one or more implementations, the electronic device 110, the handheld electronic device 104, and/or the electronic device 105 may be, and/or may include all or part of, the electronic device discussed below with respect to the electronic system discussed below with respect to FIG. 6. In one or more implementations, the electronic device 110 may be another device such as an Internet Protocol (IP) camera, a tablet, or a companion device such as an electronic stylus, etc.

The electronic device 115 may be, for example, desktop computer, a portable computing device such as a laptop computer, a smartphone, a companion device (e.g., a digital camera, headphones), a tablet device, a wearable device such as a watch, a band, and the like. In FIG. 1, by way of example, the electronic device 115 is depicted as a desktop computer. The electronic device 115 may be, and/or may include all or part of, the electronic system discussed below with respect to FIG. 8.

The server 120 may form all or part of a network of computers or a group of servers 130, such as in a cloud computing or data center implementation. For example, the server 120 stores data and software, and includes specific hardware (e.g., processors, graphics processors and other specialized or custom processors) for rendering and generating content such as graphics, images, video, audio and multi-media files for computer-generated reality environments. In an implementation, the server 120 may function as a cloud storage server that stores any of the aforementioned computer-generated reality content generated by the above-discussed devices and/or the server 120.

Embodiments of the subject technology in the present disclosure provide for the ability to provide a comfortable and seamless user experience, it may be imperative to ensure a smooth transition during a display reveal process. When a user (e.g., user 101) puts on a head mountable portable device or a headset (e.g., the electronic device 105), the system may incorporate a separate layer for the display reveal process to prevent any sudden and overwhelming experiences from abruptly occupying the user's entire computer-generated reality environment via the headset. This separate layer may facilitate a gradual and comfortable reveal. Additionally, any digital adjustments, commonly referred to as IPD (Interpupillary Distance) adjustments, may need to be performed prior to presenting any content. These IPD adjustments may serve the purpose of optimizing the visual experience. Splitting the visual state transition process into distinct stages ensures that these adjustments are implemented appropriately.

Furthermore, after completing the aforementioned steps, the system may address security measures. This may involve the inclusion of a lock screen or other authentication mechanisms. These security measures may be completed before accessing the visual state of a scene. The completion of these initial layers, which encompass comfort, visual adjustments, and security, ensures a desirable user experience.

Figure 2:
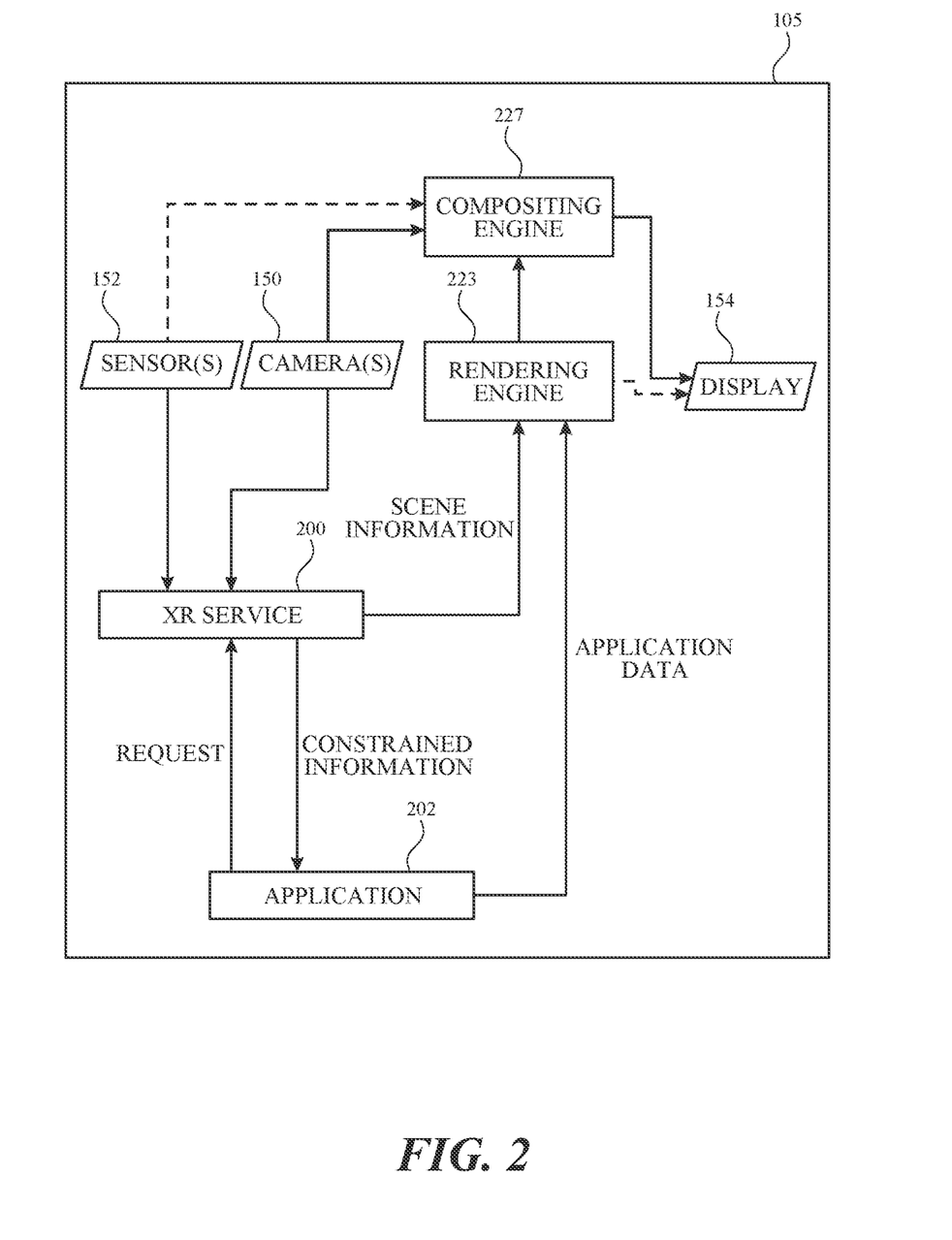
FIG. 2 illustrates an example electronic device providing system state management in a centralized rendering environment in accordance with one or more implementations of the subject technology.

FIG. 2 illustrates how a system process of the electronic device 105 may provide system state management in a centralized rendering environment. For example, FIG. 2 illustrates an example architecture that may be implemented by the electronic device 105 in accordance with one or more implementations of the subject technology. For explanatory purposes, portions of the architecture of FIG. 2 are described as being implemented by the electronic device 105 of FIG. 1, such as by a processor and/or memory of the electronic device; however, appropriate portions of the architecture may be implemented by any other electronic device, including the electronic device 110, electronic device 115, and/or server 120. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Various portions of the architecture of FIG. 2 can be implemented in software or hardware, including by one or more processors and a memory device containing instructions, which when executed by the processor cause the processor to perform the operations described herein. For example, in FIG. 2, the trapezoidal boxes may indicate that the sensors 152, the camera(s) 150 and the display 154 may be hardware components, and the rectangular boxes may indicate that the XR service 200, the application 202, the rendering engine 223, and the compositing engine 227 may be implemented in software, including by one or more processors and a memory device containing instructions, which when executed by the processor cause the processor to perform the operations described herein.

In the example of FIG. 2, an application such as application 202 provides application data to a rendering engine 223 for rendering of the application data, such as for rendering of a UI of the application 202. Application 202 may be a gaming application, a media player application, a content-editor application, a training application, a simulator application, a social media application, or generally any application that provides a UI or other content for display at a location that depends on the physical environment, such as by anchoring the UI or other content to an anchor in the physical environment. The application data may include application-generated content (e.g., windows, buttons, tools, characters, images, videos, etc.) and/or user-generated content (e.g., text, images, etc.), and information for rendering the content in the UI. In one or more implementations, rendering engine 223 renders the UI of the application 202 for display by a display such as display 154 of the electronic device 105. In one or more implementations, the XR service 200 may assign a portion of a physical environment of the electronic device to the application 202.

As shown in FIG. 2, additional information may be provided for display of the UI of the application 202, such as in a two-dimensional or three-dimensional (e.g., XR) scene. In the example of FIG. 2, sensors 152 may provide physical environment information (e.g., depth information from one or more depth sensors, motion information from one or more motion sensors), and/or user information to an XR service 200. Camera(s) 150 may also provide images of a physical environment and/or one or more portions of the user (e.g., the user's eyes, hands, face, etc.) to XR service 200. XR service 200 may generate scene information, such as three-dimensional map, of some or all of the physical environment of electronic device 105 using the environment information (e.g., the depth information and/or the images) from sensors 152 and camera(s) 150. The XR service 200 may also determine a gaze location based on images and/or other sensor data representing the position and/or orientation of the user's eye(s). The XR service 200 may also identify a gesture (e.g., a hand gesture) performed by a user of the electronic device 105, based on images and/or other sensor data representing the position and/or orientation of the user's hand(s) and/or arm(s).

As illustrated in FIG. 2, in one or more implementations, the application 202 may provide a request to the XR service 200. For example, the request may be a request for scene information (e.g., information describing the content of the physical environment), and/or a request for user information such as a request for a gaze location and/or user gesture information. In one example, the request may be an anchor request for a physical anchor (e.g., a horizontal surface, a vertical surface, a floor, a table, a wall, etc.).

Application 202 may include code that, when executed by one or more processors of electronic device 105, generates application data, for display of the UI of the application 202 on, near, attached to, or otherwise associated with an anchor location corresponding to the anchor identified by the identifier provided from XR service 200. Application 202 may include code that, when executed by one or more processors of electronic device 105, modifies and/or updates the application data based on user information (e.g., a gaze location and/or a gesture input) provided by the XR service 200.

Once the application data has been generated, the application data can be provided to the XR service 200 and/or the rendering engine 223, as illustrated in FIG. 2. As shown, scene information can also be provided to rendering engine 223. The scene information provided from the XR service 200 to the rendering engine 223 can include or be based on, as examples, environment information such as a depth map of the physical environment, and/or object information for detected objects in the physical environment. Rendering engine 223 can then render the application data from application 202 for display by display 154 of electronic device 105 to appear at a desired location in a physical environment. Display 154 may be, for example, an opaque display, and camera(s) 150 may be configured to provide a pass-through video feed to the opaque display. The UI of the application 202 may be rendered for display at a location on the display corresponding to the displayed location of a physical anchor object in the pass-through video. Display 154 may be, as another example, a transparent or translucent display. The UI of the application 202 may be rendered for display at a location on the display corresponding to a direct view, through the transparent or translucent display, of the physical environment.

As shown, in one or more implementations, electronic device 105 can also include a compositing engine 227 that composites video images of the physical environment, based on images from camera(s) 150, for display together with the UI of the application 202 from rendering engine 223. For example, compositing engine 227 may be provided in an electronic device 105 that includes an opaque display, to provide pass-through video to the display. In an electronic device 105 that is implemented with a transparent or translucent display that allows the user to directly view the physical environment, compositing engine 227 may be omitted or unused in some circumstances, or may be incorporated in rendering engine 223. Although the example of FIG. 2 illustrates a rendering engine 223 that is separate from XR service 200, it should be appreciated that XR service 200 and rendering engine 223 may form a common service and/or that rendering operations for rendering content for display can be performed by the XR service 200. Although the example of FIG. 2 illustrates a rendering engine 223 that is separate from application 202, it should be appreciated that, in some implementations, application 202 may render content for display by display 154 without using a separate rendering engine. Although a single instance of the application 202 is depicted in FIG. 2, it is appreciated that multiple applications may be running concurrently on the electronic device 105, generating application data for rendering of respective UIs for display by display 154. In one or more implementations, compositing engine 227 may composite application data for multiple UIs of multiple applications for concurrent display.

Figure 3:
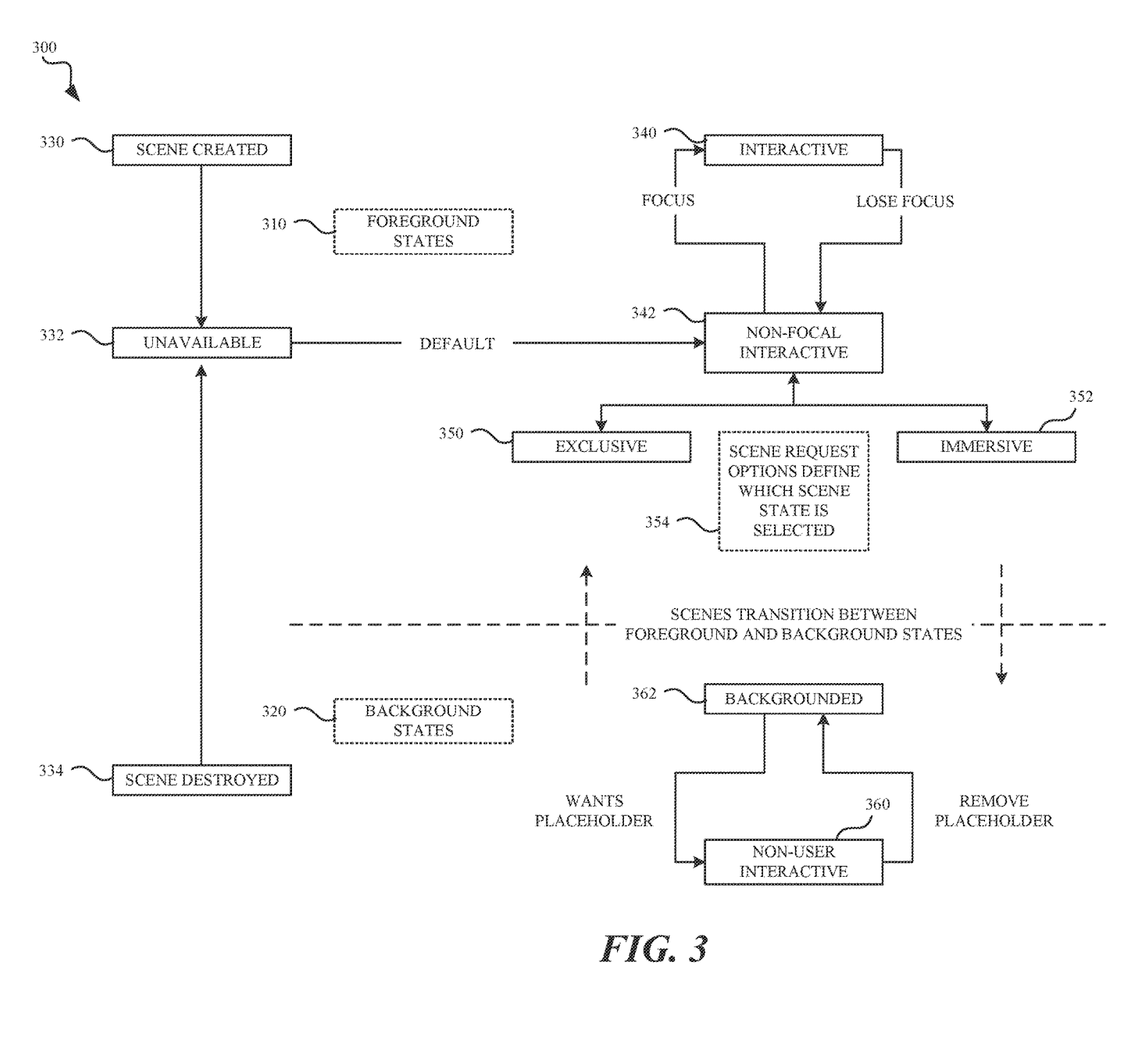
FIG. 3 illustrates a schematic diagram of a state machine for system state management in a centralized rendering environment in accordance with one or more implementations of the subject technology.

FIG. 3 illustrates a schematic diagram of an example state machine 300 for system state management in a centralized rendering environment in accordance with one or more implementations of the subject technology. As illustrated in FIG. 3, the state machine 300 depicts transitions between visual states in response to a lifecycle event. In some implementations, a lifecycle event may refer to a specific event or action that occurs within the operational cycle or lifespan of an application or system. For example, the term "lifecycle event" may be used to describe the activation of an immersive mode or the creation of a new window type, which are considered significant events within the functioning of the subject system. These events may trigger specific behaviors, such as backgrounding other applications or introducing new windows, and are an integral part of the overall lifecycle and functionality of the system or application.

A scene may refer to a container that hosts content from a client process, such as an application process, such that it will be allowed to render depending on the system provided state. In some implementations, a scene may have granular visual states. For example, a scene can be in one of multiple visual states. In some aspects, a scene can either be in a foreground state 310 or a background state 320. As illustrated in FIG. 3, scenes can transition between the foreground state 310 and the background state 320. In some implementations, a scene can be in one of multiple visual states associated with the foreground state 310 or in one of multiple visual states associated with the background state 320. In some implementations, the subject system can support multiple visual states for a head mountable portable device (e.g., the electronic device 105 of FIG. 1).

In some aspects, the state machine 300 includes an unavailable visual state 332 that represents a default visual state for a scene that is initialized or created such as visual state 330 (depicted as "scene created") and a final visual state for a scene that is destroyed such as visual state 334 (depicted as "scene destroyed"). In some aspects, the scene created visual state 330 may indicate creation of a UI window scene that can host volumetric 3D content in an alternate mode by way of an application programming interface (API) scene request. In some aspects, the API scene request may include capability to configure a default scene type for a requesting application prior to the scene creation (e.g., prior to transition to the scene created visual state 330). In some implementations, the unavailable visual state 332 may transition by default to the non-focal interactive visual state 342. In some aspects, a scene may not transition between visual states until a visual state manager process determines that content is ready to be rendered.

In some aspects, the visual states associated with the foreground state 310 includes one or more of an interactive visual state 340, a non-focal interactive visual state 342, an exclusive visual state 350, an immersive visual state 352. In some aspects, the interactive visual state 340 refers to a scene resulting in user focus (e.g., user gazing at the scene). For example, if user focus is detected responsive to a scene, then a system state transition to the interactive visual state 340 occurs. In some aspects, the non-focal interactive visual state 342 refers to a scene not resulting in user focus. For example, if a user loses focus from a scene or a user has no focus on a scene, then a system state transition to the non-focal interactive visual state 342 occurs. In some aspects, the exclusive visual state 350 refers to a specific scene that is the only scene foregrounded while all other scenes associated with a same process (as the specific scene) are backgrounded. In some aspects, the immersive visual state 352 refers to a scene and its process are foregrounded while all other scenes and their corresponding processes are backgrounded. In some aspects, the immersive visual state 330 may indicate the launch of a single immersive space scene (e.g., rendered content with no clipping borders applied) by way of an API scene request, allowing the initial launch of an application to jump directly into an immersive MR or VR experience. In some aspects, the API scene request for an immersive space scene may include capability to configure the immersive space scene statically prior to the scene creation (e.g., prior to transition to the scene created visual state 330). In some aspects, the exclusive visual state 350 and/or the immersive visual state 352 can be specified and/or requested through one or more of scene settings or a scene request (e.g., 354). In some implementations, a process may refer to a container for scenes that a system shell can attempt to host and manage the visual. A process may be a sum of its active visual states. If at least one scene is foregrounded, then that process is foregrounded. If all scenes are backgrounded or no scenes exist, then that process is either backgrounded or suspended.

In some aspects, the visual states associated with the background state 320 includes one or more of a non-user interactive visual state 360 or a backgrounded visual state 362. In some aspects, the non-user interactive visual state 360 refers to a specified scene that is backgrounded but a placeholder exists to show a visible non-interactive UI element to a user. For example, if a scene is detected to want a placeholder, then a system state transition to the non-user interactive visual state 360 may occur. Alternatively, if a scene is detected to remove a placeholder, then a system state transition to the backgrounded visual state 362 may occur.

In an aspect, a node in a logical bidirectional graph (which will be discussed in detail in FIG. 4) designated as a system UI application may request a transition in visual states based on a lifecycle event that causes its child nodes within its subtree to change visual states. For example, the system UI may be automatically dismissed by way of a scene associated with the system UI application becoming destroyed (e.g., destroyed visual state 334) or unavailable (e.g., the unavailable visual state 332). In this regard, the system UI application may transition into one of these visual states in response to a lifecycle event based on, for example, a viewing distance and/or a viewing angle relative to an object within a scene of a computer-generated reality environment. In this use case, the visual state of the system UI application node may initially be in the interactive visual state 340. Upon detecting the lifecycle event, a transition to the non-focal interactive visual state 342 or a transition to the scene destroyed visual state 334 may occur, resulting in a subsequent transition into the unavailable visual state 332. For example, the application may start to fade out and subsequently perform a dismissal animation after a threshold amount of time has passed. In some implementations, the lifecycle event may refer to a scenario where a user walks away from a system application or towards the system application, or slowly turns their head to no longer face the system application.

Figure 4:
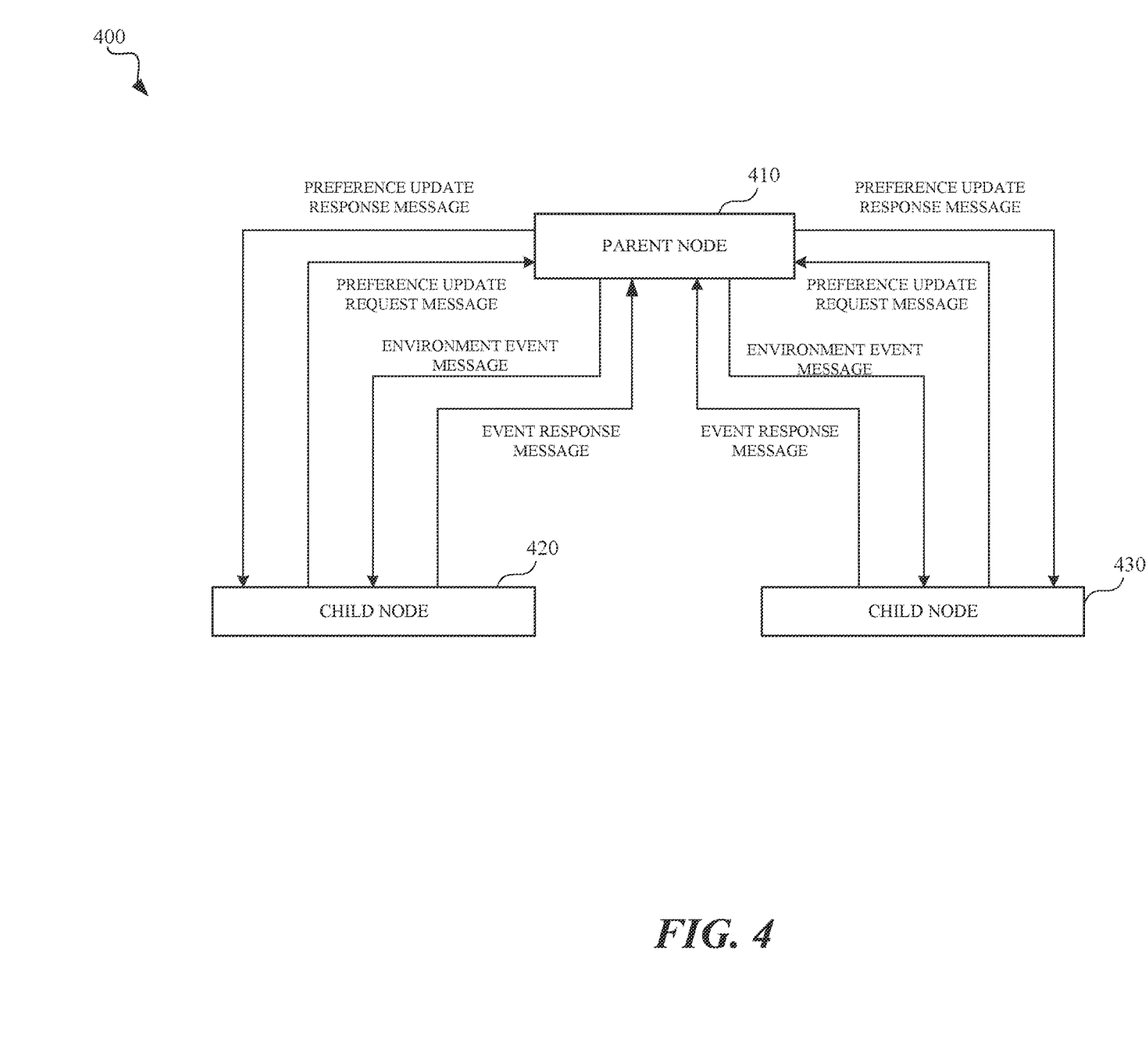
FIG. 4 illustrates a schematic diagram of an example hierarchy of system state management in a centralized rendering environment in accordance with one or more implementations of the subject technology.

FIG. 4 illustrates a schematic diagram of an example hierarchy of system state management in a centralized rendering environment in accordance with one or more implementations of the subject technology. As illustrated in FIG. 4, a logical bidirectional graph 400 may be graphically represented as a tree structure having a hierarchy of entities placed across multiple levels, where up the hierarchy includes higher-level entities such as a parent node 410 (or an ancestor node) and down the hierarchy includes lower-level entities such as child nodes 420 and 430, which can be connected to their associated parent node 410 based on predefined relationships between the nodes. Although the logical bidirectional graph 400 illustrates one parent node 410 and two child nodes 420 and 430, it should be appreciated that the logical bidirectional graph 400 can include an arbitrary number of parent nodes and ancestor nodes located at corresponding higher levels and an arbitrary number of child nodes located at corresponding lower levels.

The present disclosure provides for a system that manages lifecycles of vended scenes and various lifecycle states it handles. At a high level, a scene lifecycle may be maintained by the logical bidirectional graph 400 that allows for a hierarchy of scene sessions and their owners, enabling the logical bidirectional graph 400 to push down messages of events and for nodes in the logical bidirectional graph 400 to bubble up their preferences. When nodes in the logical bidirectional graph 400 push down messages, these nodes are pushing down an environment event message to notify the child nodes 420, 430 what is happening to the logical bidirectional graph 400 from a top-down level and allowing the child nodes 420, 430 to respond to these events. Child nodes 420, 430 can also post responses to the events to let parent nodes and/or ancestor nodes know what happened. When a child node in the logical bidirectional graph 400 bubbles up a message, it is sending a preference update message to notify the parent nodes and/or ancestor nodes of its requests and attempts. The parent nodes and/or ancestor nodes can send their responses to the preference update messages to notify the child nodes 420, 430 of which preferences are allowed.

In some implementations, the modifier event response refers to an object sent as a result of a preference update message from a child node or an environment event message from an ancestor node being sent through the logical bidirectional graph 400. The environment event message may be sent by an ancestor node and traverses the logical bidirectional graph 400 to a child node to notify the child node of an event or state change to apply. The preference update message may be sent by a child node and traverses the logical bidirectional graph 400 to an ancestor node to notify the ancestor node of its request and preference updates.

In some implementations, the logical bidirectional graph 400 can also be constructed to handle different modes by adding and removing nodes on demand to allow for specific configurations. In some implementations, the layout and configuration of the logical bidirectional graph 400 may vary based on different modes. For example, during a first boot up or setup mode of the system, the layout of the logical bidirectional graph 400 configuration may be simple. This mode, known as the setup mode, may launch an application that restricts user interaction until the setup is completed. Only after finishing the setup can the system transition into other modes, thus transitioning into other visual states. For example, the system can transition into a sharing mode that allows users to initiate the setup flow for sharing purposes. In another example, the system can transition into a demo mode that offers limited actions and functionalities. In still another example, the system can transition into a default system mode where the system operates under normal conditions. Additionally, there are other supported modes, including accessibility mode, which enables a focus mode where only one application can be open at a time. It should be appreciated by one skilled in the art that the system's versatility allows for the support of various modes, and these modes can be dynamically adjusted without causing significant disruption to the user experience. This flexibility ensures that the system can adapt to different requirements and seamlessly transition between modes as needed.

In some implementations, for each mode transition, a separate logical bidirectional graph may not be created for each mode. Instead, the logical bidirectional graph 400 can be reconfigured to display the interconnections between nodes for the different modes. For example, during the initial boot-up and setup phase, the logical bidirectional graph 400 with a layout corresponding to the mode may be established. However, once the setup is completed, the subtree corresponding to the initial setup may be removed from, or disabled within, the logical bidirectional graph 400. Subsequently, the system may reintegrate the existing logical components within the logical bidirectional graph 400 by interconnecting the corresponding nodes according to the layout of the current mode. In some implementations, once a particular node is no longer required, the connection can be detached, resulting in its complete removal. Alternatively, if the system determines that the node may be needed again in the future, the connection is temporarily disconnected and stored in memory. If the need arises to reestablish the connection, it can be readily reintroduced into the logical bidirectional graph 400 with the prior interconnections with associated nodes. In this regard, the logical bidirectional graph 400 may remain continuous and can be dynamically reconfigured on the fly based on various system variables.

Embodiments of the subject technology in the present disclosure provide for the ability to accommodate a wide range of configurations within the logical bidirectional graph 400. By swapping out different levels, the system can support a high number of distinct layout configurations that correspond to respective modes of the 3D UI experience. Maintaining a smooth user experience with minimal disruption is desirable. To achieve this, the subject technology aims to enhance the dimensionality and properties of each node in the logical bidirectional graph 400 without introducing unnecessary complexity. The overall complexity of the system is determined by the number of levels incorporated the logical bidirectional graph 400. In some implementations, all levels the logical bidirectional graph 400 can be dynamically swappable, allowing for seamless integration of additional elements as the system expands in complexity. When incorporating new components, such as complex decision-making elements, these additions can be seamlessly plugged into the logical bidirectional graph 400 in some implementations. The decisions made within these individual components contribute to the overall system state, while the foundational levels of the logical bidirectional graph 400 remain unaffected. Consequently, these decisions can influence the final system state, enabling the creation of diverse 3D UI experiences, multitasking capabilities, and coexisting immersive and shared experiences. The system is designed to effectively handle these varied scenarios.

The construction of the logical bidirectional graph 400 facilitates bidirectional communication without the need for global management of all nodes in the hierarchies of the logical bidirectional graph 400. Messages can flow in both directions between levels of the logical bidirectional graph 400, allowing nodes to request or deny access and impose constraints dynamically. This continuous exchange of messages ensures that the system remains in an appropriate state for the user, considering the current variables and environment information available. To illustrate this message passing process, the minimal construction needed for the system's launch and the creation of a layout manager are explained. Initially, the logical bidirectional graph 400 starts empty, and it is only during system setup that the appropriate configuration becomes known. During the first system setup, a set of 3D UI experiences, including a minimal system UI, are initialized. This can form the basis for constructing the system to ensure an appropriate configuration. Subsequently, further actions or next steps can be determined after completing the setup process.

In some implementations, the child nodes 420, 430 can transmit preference updates to their respective parents (e.g., parent node 410), while the parent nodes can distribute environment updates to associated child nodes. In all cases, responses are generated to determine the appropriate computational adjustments. When it comes to setting preferences, the process may entail the child nodes 420, 430 being able to define and specify their preferences. This involves the utilization of a data structure that is passed down the hierarchy, allowing the child nodes 420, 430 to list or indicate their preferences. Subsequently, the data structure is transmitted back up to their respective parent nodes (e.g., parent node 410), and potentially further up the hierarchy, depending on the specific requirements. By employing this mechanism, the preferences determined by the child nodes 420, 430 can be communicated to its parent node 410 and potentially propagated to subsequent parent nodes up in the hierarchy. The data structure can serve to facilitate the transmission and organization of these preferences, ensuring a coherent and efficient flow of information within the logical bidirectional graph 400.

In some implementations, the message propagation mechanism within the logical bidirectional graph 400 may include propagating messages downward through the levels as far as possible; however, each node at every level can retain autonomy to decide whether to halt the message and process the message or allow it to pass through to lower levels. The determination can be contingent upon the nature of the message being transmitted. While most messages tend to propagate throughout the logical bidirectional graph 400, there may be certain messages that require limited dissemination, such as those related to IPD display, lock screen visibility, or passcode update failure. The choice to restrict message propagation can depend on the specific configuration and situational requirements, allowing certain nodes to stop, consume, or redirect the message based on the accompanying data.

In some implementations, a higher-level node (or ancestor node) can be notified by a component within the system. Subsequently, the remaining system components engage in message and prevention operations. When a change is detected in a particular level of the logical bidirectional graph 400, the system space conveys this information to lower-level nodes. The shared experiences contained within the logical bidirectional graph 400 are then transmitted to the user by way of sending a composited video stream to a display device (e.g., display 154 of the electronic device 105) of a user (e.g., user 101) by which the composited video stream was rendered according to corresponding visual states in the logical bidirectional graph 400. In some implementations, a middle level may undergo an immersive mode transition. To facilitate this transition, a request is made by a node corresponding to the immersive mode function, prompting the system to reconfigure the layout of the logical bidirectional graph 400 and adapt its configuration accordingly. Once the logical bidirectional graph 400 is reconfigured to reflect the requested visual state transition, the user's computer-generated reality environment space is rendered immersive, enabling a virtual reality-like user experience. If the decision is later made to exit this immersive mode, other applications can be reintroduced by way of resuming such applications from their last known visual state, leading to the reconstruction of the logical bidirectional graph 400 to accurately reflect the current visual state. A similar process may occur when applications are closed, ensuring visual consistency.

The immersive mode may be attributed partly to the backgrounding of other applications because a new window type is created to facilitate the immersive experience. This new window type may allow clients to draw content around the user, which may not be feasible in the default window mode due to clipping and bounding. Creating a new window, whether by replacement or augmentation, may be considered a lifecycle event as it involves the introduction of a different window that replaces or accompanies the prior windows. The decision of whether to replace or augment may depend on specific use cases, such as playing a full-screen video where the window may replace the previous screen or playing a new video that simply opens in a new window.

At the outset of when the logical bidirectional graph 400 is established, in which multiple 3D UI experiences are organized as 2D sub-nodes under a primary root node, various nodes for security purposes and other functionalities are also incorporated. The logical bidirectional graph 400 may graphically represent how the different scene modes are changed and how visual states transition by way of a traversal through the logical bidirectional graph 400. For instance, when transitioning one of these experiences into an immersive mode, the visual state change may propagate from the primary root node down to a lower-level node designated as the node for the main experience, indicating that other experiences may no longer be displayed (e.g., via the display 154 of the electronic device 105).

For example, the system may detect that a mail application desires to become immersive. In this case, the mail application may send a request indicating its intention to become immersive. This request can traverse through the logical bidirectional graph 400, reaching the designated node that can respond to such requests. The designated node can acknowledge the request and proceed to configure the subtree accordingly. In some aspects, the designated node may create a new child node and configure the subtree as immersive or hide certain components. If there are other experiences or sub-nodes within this subtree, these child nodes may be instructed by way of an environment event message to hide themselves (or become disabled from view) or be informed that they will not be rendered due to the immersive mode activation. Consequently, only the relevant components, such as the mail application and its associated siblings, would remain rendered. If other parts of the logical bidirectional graph 400 requires information about this specific message from the parent node, those other nodes can respond by hiding certain elements in its associated subtree or displaying different user interfaces based on the current visual state.

In some examples, a first application may request a visual state transition into an immersive mode and subsequently a second application may request the same transition. In this use case, if the first application, first in time, is requesting to transition into an immersion mode, a message is propagated from the UI to a node in the logical bidirectional graph 400 designated as a scene manager that can act as the interface for new window requests. The scene manager can forward the message to another node in the logical bidirectional graph 400 designated as a layout manager that may be responsible for window creation and destruction events. The layout manager may then redirect the message through the logical bidirectional graph 400 to a node designated as the third-party experience, signaling that one of its child nodes is requesting a transition into the immersion mode. In response, the respective applications cease rendering and disable their respective child nodes temporarily. In some aspects, only one application can be allowed to become immersive within this subtree due to a defined policy, thus requiring the second application to await the next available opportunity to become immersive. In some implementations, inactive applications may not expend central processing unit (CPU) or graphics processing unit (GPU) usage while the corresponding nodes of the inactive applications are disabled, thus improving memory and/or processor utilization. The CPU or GPU usage of non-immersive apps may refer to the inactive applications being hibernated by the operating system. In some aspects, the transition to hibernation is initiated either by the application itself in response to a visual state change or by the operating system, which may notify the application that it is about to be hibernated.

In some implementations, the behavior and decision-making process of each node within the system can be made at each level of the logical bidirectional graph 400. For example, each level of the logical bidirectional graph 400 possesses the capability to make intricate decisions. Input is processed at every level of the logical bidirectional graph 400. Instead of developing a singular global manager that requires extensive coding, the system is implemented with a multi-level approach. This approach enables efficient decision-making by considering all variables and making informed choices at corresponding nodes in each level. By adopting this multi-level approach, the need to pause operations or gather additional inputs can be averted. In some implementations, each node in the logical bidirectional graph 400 may be compartmentalized with corresponding data, allowing for complex decision-making to be distilled into the individual nodes or levels. This ensures that the system adheres to a desired policy at any given time.

Within the context of the logical bidirectional graph 400 that includes the parent node 410 and child nodes 420, 430, requests from the child nodes 420, 430 may traverse one or more levels of the logical bidirectional graph 400 back to their respective parent node or ancestor node (e.g., the parent node 410). In some implementations, each level and node within the logical bidirectional graph 400 has the capability to act as the final gatekeeper in both directions. For instance, if a message is specific to the lock screen function and is not relevant to the rest of the logical bidirectional graph 400, it may be handled exclusively at that level, without further propagation. However, in other scenarios, messages can traverse multiple levels, reaching higher-level nodes in the logical bidirectional graph 400. For example, if a notification is received by a node, it may send a preference request up to a higher level in the logical bidirectional graph 400, seeking permission to perform a certain action. This request can propagate up until it reaches the uppermost levels of the logical bidirectional graph 400, where a decision can be made. The response can then traverse back down through the levels of the logical bidirectional graph 400, potentially reaching the original node.

In some implementations, the gatekeeping behavior of each node can vary. While some nodes may choose to act as gatekeepers and intercept or modify the responses from child nodes, other nodes may allow the responses to pass through to higher-level nodes. Consequently, if a response indicating the system is locked reaches the node, it may result in specific actions being taken due to the node's awareness of the locked state. The decision-making process may involve determining whether the flow of decisions should propagate upstream to one or multiple parent nodes until reaching the final decision maker, and subsequently responding back to the requesting node.

In some implementations, each node may possess knowledge of the specific information state it is concerned with, aiming to minimize the need for excessive information exchange with other nodes across multiple levels in the logical bidirectional graph 400. For instance, a node representing the locking component may maintain awareness of whether the system is locked and determines the appropriate authentication mode to utilize. It can also indicate if the device is locked, although it may lack knowledge about other aspects of the system state. Similarly, the remaining nodes within the system may process the information that pertains to their designated roles or responsibilities. Accordingly, the node can limit its awareness to relevant information and avoid unnecessary knowledge accumulation, optimizing the efficiency and effectiveness of the decision-making process within the logical bidirectional graph 400. This differentiated approach ensures that each node within the logical bidirectional graph 400 can operate within its designated scope and contributes to the overall system's functionality.

A gatekeeper node, responsible for determining whether to pass a message from a higher level to a child node (e.g., child nodes 420, 430), may rely on specific information about the child node to make its decision. The system may implement a personalized policy that dictates the criteria upon which the gatekeeper node's decision is based. As the parent and owner of the child nodes 420, 430, the gatekeeper node can possess comprehensive information about these child nodes. However, the gatekeeper node may only know what its parent nodes have preconfigured and the lower-level child nodes it is concerned with. For instance, a node in the logical bidirectional graph 400 designated as a lock screen node can serve as a gatekeeper node and is aware of which windows should be sent down and whether the electronic device 105 is locked or not. It may not possess additional context beyond its corresponding logical function. In another example, a node in the logical bidirectional graph 400 designated as a systems scene layout may serve as a gatekeeper node. This node may function as a logical component responsible for managing the policy between third-party experiences and certain first-party experiences. For instance, in a scenario where the last visible window is closed, triggering the need for the home UI to appear, this policy may be enforced. The node designated to oversee the third-party experiences, unaware of or unconcerned with the home UI, may relay a message to its parent node indicating the window closure of the last scene. Subsequently, the system scene layout node, acting as the policy enforcer, receives this message and initiates the display of the home UI by directing the message to the appropriate child node within its subtree. While the gatekeeper node can dynamically request more information from its child nodes 420, 430, the gatekeeper node may store that visual state information in volatile memory in some implementations, or in non-volatile memory in other implementations. Although the parent node 410 may be knowledgeable about its child nodes 420, 430, some preference updates from the child nodes 420, 430 to the parent node 410 can factor in shaping that knowledge.

Figure 5:
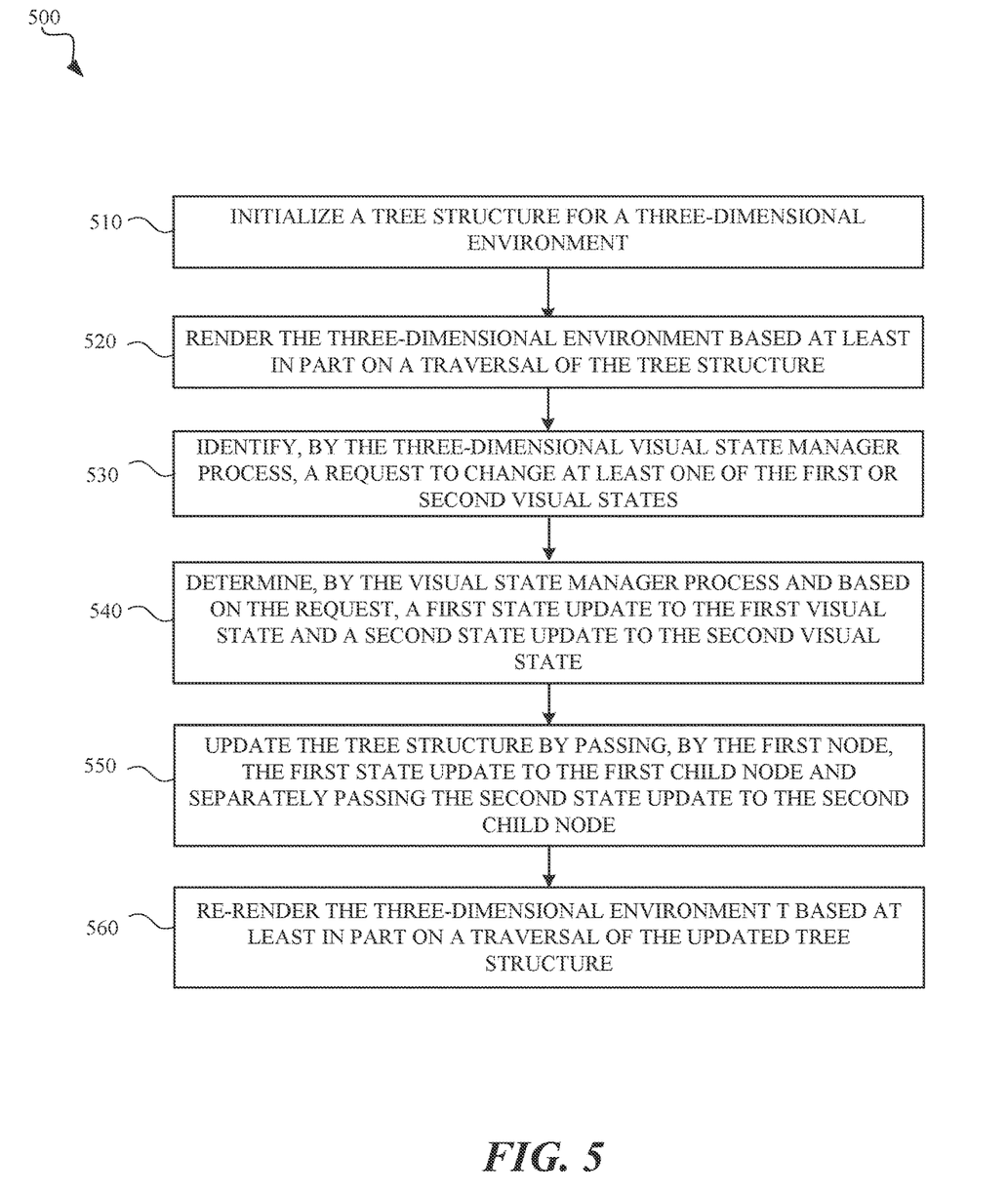
FIG. 5 illustrates a flow diagram of an example process for providing system state management in a centralized rendering environment in accordance with one or more implementations of the subject technology.

FIG. 5 illustrates a flow diagram of an example process 500 for providing multiple user interface modes for a user interface of an application in accordance with implementations of the subject technology. For explanatory purposes, the process 500 is primarily described herein with reference to the electronic device 105 of FIG. 1. However, the process 500 is not limited to the electronic device 105 of FIG. 1, and one or more blocks (or operations) of the process 500 may be performed by one or more other components of other suitable devices, including the electronic device 104, the electronic device 110, and/or the electronic device 115. Further for explanatory purposes, some of the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

As illustrated in FIG. 5, at block 510, a tree structure for a three-dimensional environment may be initialized. For example, the electronic device 105 may initialize the logical bidirectional graph 400, as described with reference to FIG. 4. In an aspect, the tree structure includes at least a first node corresponding to a visual state manager process and the first node having at least a first child node and a second child node. In some aspects, the first child node corresponds to a first visual state for a first application process and the second child node corresponds to a second visual state for a second application process. In some aspects, the first child node is a first root node of a first render tree of the first application process and the second child node is a second root node of a second render tree of the second application process. In some aspects, the first node corresponding to the visual state manager process may receive a first set of preferences from the first child node and a second set of preferences from the second child node. In some aspects, the first set of preferences correspond to first display preferences associated with one or more first nodes in the first render tree and the second set of preferences correspond to second display preferences associated with one or more second nodes in the second render tree. In some aspects, the first node may sending, to the first child node and in response to receiving the first set of preferences, a first preference update response indicating which of the first display preferences are allowed by the visual state manager process and separately send, to the second child node and in response to receiving the second set of preferences, a second preference update response indicating which of the second display preferences are allowed by the visual state manager process. In some aspects, the first node may receive a first state update response from the first child node based at least in part on the first state update and a second state update response from the second child node based at least in part on the second state update.

At block 520, the electronic device, via a rendering engine, may render the three-dimensional environment based at least in part on a traversal of the tree structure.

At block 530, the electronic device may identify, by the visual state manager process, a request to change at least one of the first or second visual states. In some aspects, the request to change the at least one of the first or second visual states includes a request for the three-dimensional environment to be displayed in an immersive mode.

At block 540, the visual state manager may determine to process, based on the request, a first state update to the first visual state and a second state update to the second visual state. In some aspects, the first state update includes an immersive state and the second state update comprises a background state. In some aspects, the three-dimensional environment is not displayed in the background state. In some aspects, the first state update and the second state update are passed concurrently between the first child node and the second child node respectively.

At block 550, the electronic device may update the tree structure by passing, by the first node, the first state update to the first child node and separately passing the second state update to the second child node.

At block 560, the electronic device may re-render the three-dimensional environment based at least in part on a traversal of the updated tree structure.

As described above, aspects of the subject technology may include the collection of data. The present disclosure contemplates that in some instances, this collected data may include personal information data that uniquely identifies or can be used to identify a specific person. Such personal information data can include demographic data, location-based data, online identifiers, telephone numbers, email addresses, home addresses data, image data, audio data, environment data, or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for providing various user interface modes of a user interface of an application running on an electronic device. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates implementations in which users selectively block the use of, or access to, personal information data. That is, the present disclosure contemplates that hardware and/or software elements can be provided to prevent or block access to such personal information data. For example, in the case of providing various user interface modes of a user interface of an application running on an electronic device, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 6:
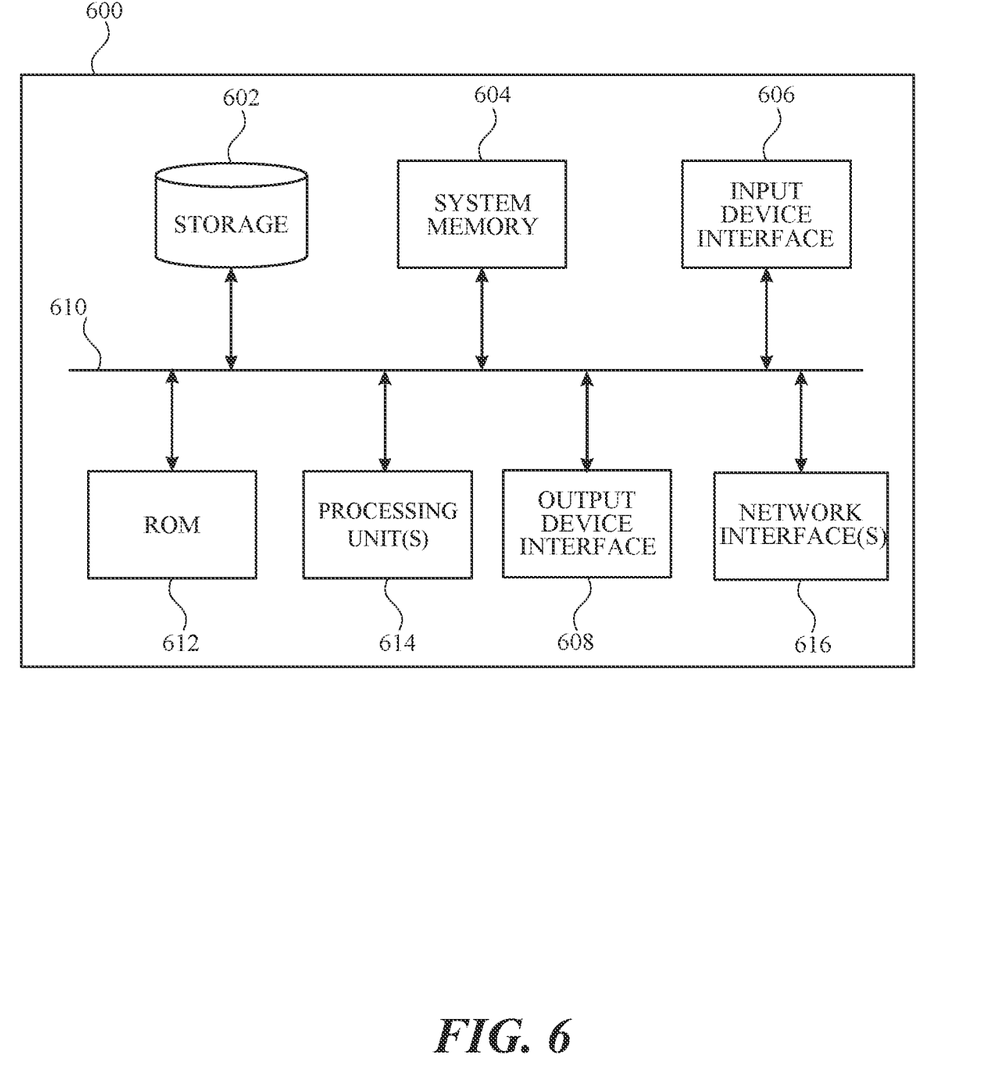
FIG. 6 illustrates an example computing device with which aspects of the subject technology may be implemented.

FIG. 6 illustrates an example computing device with which aspects of the subject technology may be implemented in accordance with one or more implementations. The computing device 600 can be, and/or can be a part of, any computing device or server for generating the features and processes described above, including but not limited to a laptop computer, a smartphone, a tablet device, a wearable device such as a goggles or glasses, and the like. The computing device 600 may include various types of computer readable media and interfaces for various other types of computer readable media. The computing device 600 includes a permanent storage device 602, a system memory 604 (and/or buffer), an input device interface 606, an output device interface 608, a bus 610, a ROM 612, one or more processing unit(s) 614, one or more network interface(s) 616, and/or subsets and variations thereof.

The bus 610 collectively represents all system, peripheral, and chipset buses that communicatively connect the numerous internal devices of the computing device 600. In one or more implementations, the bus 610 communicatively connects the one or more processing unit(s) 614 with the ROM 612, the system memory 604, and the permanent storage device 602. From these various memory units, the one or more processing unit(s) 614 retrieves instructions to execute and data to process in order to execute the processes of the subject disclosure. The one or more processing unit(s) 614 can be a single processor or a multi-core processor in different implementations.

The ROM 612 stores static data and instructions that are needed by the one or more processing unit(s) 614 and other modules of the computing device 600. The permanent storage device 602, on the other hand, may be a read-and-write memory device. The permanent storage device 602 may be a non-volatile memory unit that stores instructions and data even when the computing device 600 is off. In one or more implementations, a mass-storage device (such as a magnetic or optical disk and its corresponding disk drive) may be used as the permanent storage device 602.

In one or more implementations, a removable storage device (such as a flash drive and its corresponding solid-state drive) may be used as the permanent storage device 602. Like the permanent storage device 602, the system memory 604 may be a read-and-write memory device. However, unlike the permanent storage device 602, the system memory 604 may be a volatile read-and-write memory, such as random access memory. The system memory 604 may store any of the instructions and data that one or more processing unit(s) 614 may need at runtime. In one or more implementations, the processes of the subject disclosure are stored in the system memory 604, the permanent storage device 602, and/or the ROM 612. From these various memory units, the one or more processing unit(s) 614 retrieves instructions to execute and data to process in order to execute the processes of one or more implementations.

The bus 610 also connects to the input and output device interfaces 606 and 608. The input device interface 606 enables a user to communicate information and select commands to the computing device 600. Input devices that may be used with the input device interface 606 may include, for example, alphanumeric keyboards and pointing devices (also called "cursor control devices"). The output device interface 608 may enable, for example, the display of images generated by computing device 600. Output devices that may be used with the output device interface 608 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 6, the bus 610 also couples the computing device 600 to one or more networks and/or to one or more network nodes through the one or more network interface(s) 616. In this manner, the computing device 600 can be a part of a network of computers (such as a LAN, a wide area network ("WAN"), or an Intranet, or a network of networks, such as the Internet. Any or all components of the computing device 600 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components (e.g., computer program products) and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   initializing a tree structure for a three-dimensional environment, the tree structure comprising at least a first node corresponding to a visual state manager process and the first node having at least a first child node and a second child node, wherein the first child node corresponds to a first visual state for a first application process and the second child node corresponds to a second visual state for a second application process;
   rendering the three-dimensional environment based at least in part on a traversal of the tree structure;
   identifying, by the visual state manager process, a request to change at least one of the first or second visual states;
   determining, by the visual state manager process and based on the request, at least one of a first state update to the first visual state or a second state update to the second visual state;
   updating the tree structure by performing at least one of:
      passing, by the first node, the first state update to the first child node or separately passing the second state update to the second child node; and
   re-rendering the three-dimensional environment based at least in part on a traversal of the updated tree structure.

2. The method of claim 1, wherein the request to change the at least one of the first or second visual states comprises a request for the three-dimensional environment to be displayed in an immersive mode.

3. The method of claim 2, wherein the first state update comprises an immersive state and the second state update comprises a background state.

4. The method of claim 3, wherein the three-dimensional environment is not displayed in the background state.

5. The method of claim 1, wherein the first child node is a first root node of a first render tree of the first application process and the second child node is a second root node of a second render tree of the second application process.

6. The method of claim 5, further comprising:
   receiving, by the first node corresponding to the visual state manager process, a first set of preferences from the first child node and a second set of preferences from the second child node, wherein the first set of preferences correspond to first display preferences associated with one or more first nodes in the first render tree and the second set of preferences correspond to second display preferences associated with one or more second nodes in the second render tree.

7. The method of claim 6, further comprising sending, to the first child node and in response to receiving the first set of preferences, a first preference update response indicating which of the first display preferences are allowed by the visual state manager process and separately sending, to the second child node and in response to receiving the second set of preferences, a second preference update response indicating which of the second display preferences are allowed by the visual state manager process.

8. The method of claim 1, further comprising receiving, by the first node, a first state update response from the first child node based at least in part on the first state update and a second state update response from the second child node based at least in part on the second state update.

9. The method of claim 1, wherein the first state update and the second state update are passed concurrently between the first child node and the second child node respectively.

10. The method of claim 1, wherein the request indicates to change the first visual state and the second visual state, wherein the determining comprises determining, based on the request, the first state update to the first visual state and the second state update to the second visual state, and wherein the tree structure is updated by passing, by the first node, the first state update to the first child node and separately passing the second state update to the second child node.

11. A device, comprising:
   a memory; and
   one or more processors configured to:
      initialize a tree structure for a three-dimensional environment, the tree structure comprising at least a first node corresponding to a visual state manager process and the first node having at least a first child node and a second child node, wherein the first child node corresponds to a first visual state for a first application process and the second child node corresponds to a second visual state for a second application process;
      render the three-dimensional environment based at least in part on a traversal of the tree structure;
      identify, by the visual state manager process, a request to change at least one of the first or second visual states;
      determine, by the visual state manager process and based on the request, at least one of a first state update to the first visual state or a second state update to the second visual state;
      update the tree structure by performing at least one of:
         passing, by the first node, the first state update to the first child node or separately passing the second state update to the second child node; and re-render the three-dimensional environment based at least in part on a traversal of the updated tree structure.

12. The device of claim 11, wherein the request to change the at least one of the first or second visual states comprises a request for the three-dimensional environment to be displayed in an immersive mode.

13. The device of claim 12, wherein the first state update comprises an immersive state and the second state update comprises a background state.

14. The device of claim 13, wherein the three-dimensional environment is not displayed in the background state.

15. The device of claim 11, wherein the first child node is a first root node of a first render tree of the first application process and the second child node is a second root node of a second render tree of the second application process.

16. The device of claim 15, wherein the one or more processors are further configured to receive, by the first node corresponding to the visual state manager process, a first set of preferences from the first child node and a second set of preferences from the second child node, wherein the first set of preferences correspond to first display preferences associated with one or more first nodes in the first render tree and the second set of preferences correspond to second display preferences associated with one or more second nodes in the second render tree.

17. The device of claim 16, wherein the one or more processors are further configured to send, to the first child node and in response to receiving the first set of preferences, a first preference update response indicating which of the first display preferences are allowed by the visual state manager process and separately sending, to the second child node and in response to receiving the second set of preferences, a second preference update response indicating which of the second display preferences are allowed by the visual state manager process.

18. The device of claim 11, wherein the one or more processors are further configured to receive, by the first node, a first state update response from the first child node based at least in part on the first state update and a second state update response from the second child node based at least in part on the second state update.

19. The device of claim 11, wherein the first state update and the second state update are passed concurrently between the first child node and the second child node respectively.

20. A non-transitory computer-readable medium storing instructions that, when executed by one or more processors, cause the one or more processors to cause:
   initializing a tree structure for a three-dimensional environment, the tree structure comprising at least a first node corresponding to a visual state manager process and the first node having at least a first child node and a second child node, wherein the first child node corresponds to a first visual state for a first application process and the second child node corresponds to a second visual state for a second application process;
   rendering the three-dimensional environment based at least in part on a traversal of the tree structure;
   identifying, by the visual state manager process, a request to change at least one of the first or second visual states;
   determining, by the visual state manager process and based on the request, at least one of a first state update to the first visual state or a second state update to the second visual state;
   updating the tree structure by performing at least one of:
      passing, by the first node, the first state update to the first child node or separately passing the second state update to the second child node; and
   re-rendering the three-dimensional environment based at least in part on a traversal of the updated tree structure.

* * * * *